(12) United States Patent
van der Vliet et al.

(10) Patent No.: US 12,435,434 B2
(45) Date of Patent: Oct. 7, 2025

(54) METHOD FOR CONDITIONING AN ELECTROLYSIS SYSTEM

(71) Applicant: UOP LLC, Des Plaines, IL (US)

(72) Inventors: Dennis F. van der Vliet, Skokie, IL (US); Chunqing Liu, Arlington Heights, IL (US); Xueliang Dong, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 550 days.

(21) Appl. No.: 18/046,587

(22) Filed: Oct. 14, 2022

(65) Prior Publication Data

US 2023/0250545 A1 Aug. 10, 2023

Related U.S. Application Data

(60) Provisional application No. 63/267,803, filed on Feb. 10, 2022.

(51) Int. Cl.
| | |
|---|---|
| C25B 15/021 | (2021.01) |
| C25B 1/04 | (2021.01) |
| C25B 9/21 | (2021.01) |
| C25B 9/23 | (2021.01) |
| C25B 9/67 | (2021.01) |
| C25B 11/081 | (2021.01) |
| C25B 13/02 | (2006.01) |
| C25B 13/04 | (2021.01) |

(52) U.S. Cl.
CPC .............. *C25B 15/021* (2021.01); *C25B 1/04* (2013.01); *C25B 9/21* (2021.01); *C25B 9/23* (2021.01); *C25B 9/67* (2021.01); *C25B 11/081* (2021.01); *C25B 13/02* (2013.01); *C25B 13/04* (2013.01)

(58) Field of Classification Search
CPC ........... C25B 1/04; C25B 9/67; C25B 15/021; C25B 15/027
See application file for complete search history.

(56) References Cited

U.S. PATENT DOCUMENTS

| | | | |
|---|---|---|---|
| 11,913,124 B2 * | 2/2024 | Yoshida | ................ C25B 15/021 |
| 2002/0071972 A1 | 6/2002 | Gebhardt et al. | |
| 2006/0199051 A1 | 9/2006 | Bai et al. | |
| 2006/0292410 A1 | 12/2006 | Kaupert et al. | |
| 2007/0000789 A1 * | 1/2007 | Libby | ....................... C25B 1/04 |
| | | | 205/637 |

(Continued)

FOREIGN PATENT DOCUMENTS

| | | |
|---|---|---|
| EP | 1826855 A2 | 8/2007 |
| NO | 343985 B1 | 1/2019 |
| WO | 2019009732 A2 | 1/2019 |

OTHER PUBLICATIONS

International Search Report from corresponding PCT application No. PCT/US2023/061963, mailed Jul. 10, 2023.

(Continued)

*Primary Examiner* — Brian W Cohen

(57) ABSTRACT

A start-up process for conditioning an electrolysis system containing ionically conductive membrane, such as a polyelectrolyte multilayer coated proton exchange membranes, to reduce the break-in period is described. The conditioning involves heating the electrolysis feed, the electrolysis system, or both at a temperature above the desired operating temperature to achieve faster startup. In some cases, the voltage is controlled to avoid damage to the sample.

20 Claims, 2 Drawing Sheets

(56) References Cited

U.S. PATENT DOCUMENTS

| | | |
|---|---|---|
| 2013/0108514 A1 | 5/2013 | Edlund et al. |
| 2019/0260035 A1* | 8/2019 | Steinbach ............ H01M 4/9058 |
| 2021/0222307 A1* | 7/2021 | Evans ........................ C25B 9/67 |
| 2023/0054716 A1* | 2/2023 | Gogoana ................... C25B 9/17 |

OTHER PUBLICATIONS

Written Opinion from corresponding PCT application No. PCT/US2023/061963, mailed Jul. 10, 2023.
Bender, G. et al., Initial Approaches in Benchmarking and Round Robin Testing for Proton Exchange Membrane Water Electrolyzers, International Journal of Hydrogen Energy, 44(18), Apr. 5, 2019.

\* cited by examiner

METHOD FOR CONDITIONING AN ELECTROLYSIS SYSTEM

RELATED APPLICATIONS

This application claims priority to U.S. Provisional Patent Application Ser. No. 63/267,803, filed on Feb. 10, 2022, the entirety of which is incorporated herein by reference.

BACKGROUND

Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Eq. 1 below. The water electrolysis process is an endothermic process and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) water electrolysis (PEMWE), anion exchange membrane (AEM) water electrolysis (AEMWE), and solid oxide water electrolysis.

In the PEM water electrolysis system, an anode and a cathode are separated by a solid PEM electrolyte such as a sulfonated tetrafluoroethylene based fluoropolymer copolymer sold under the trademark Nafion® by Chemours company. The anode and cathode catalysts typically comprise $IrO_2$ and Pt, respectively. At the positively charged anode, pure water is oxidized to produce oxygen gas, electrons (e), and protons; the reaction is given by Eq. 2. The protons are transported from the anode to the cathode through the PEM that conducts protons. At the negatively charged cathode, a reduction reaction takes place with electrons from the cathode being given to protons to form hydrogen gas; the reaction is given by Eq. 3. The PEM not only conducts protons from the anode to the cathode, but also separates the $H_2$ and $O_2$ produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware, expensive noble metal catalysts required for the electrodes, as well as the expensive PEM.

Water electrolysis reaction: $2H_2O \rightarrow 2H_2 + O_2$ (1)

Oxidation reaction at anode for PEMWE:
$2H_2O \rightarrow O_2 + 4H^+ + 4e^-$ (2)

Reduction reaction at cathode for PEMWE: $2H^+ + 2e^- \rightarrow H_2$ (3)

The anode is the electrode at which the predominant reaction is oxidation (e.g., the water oxidation/oxygen evolution reaction electrode for a water electrolyzer). The cathode is the electrode at which the predominant reaction is reduction (e.g., the proton reduction/hydrogen evolution reaction electrode for a water electrolyzer). The membrane is one of the key materials that make up an electrolysis cell and is an important driver for safety and performance. Some important properties for membranes for membrane electrolysis include high conductivity, high ionic permeability, high ionic exchange capacity (for ion-exchange membrane), high ionic/$H_2$ and $O_2$ selectivity (low $H_2$ and $O_2$ permeability/crossover), low price, low area resistance to minimize efficiency loss resulting from ohmic polarization, high resistance to oxidizing and reducing conditions, being chemically inert at a wide pH range, high thermal stability together with high proton conductivity, and high mechanical strength (thickness, low swelling).

Significant advances are needed in cost-effective, high performance, stable catalysts, membrane materials and other cell stack components, as well as methods of operating PEMWE cells for water electrolysis with a wide range of applications in renewable energy systems.

DESCRIPTION OF THE INVENTION

Figure 1:
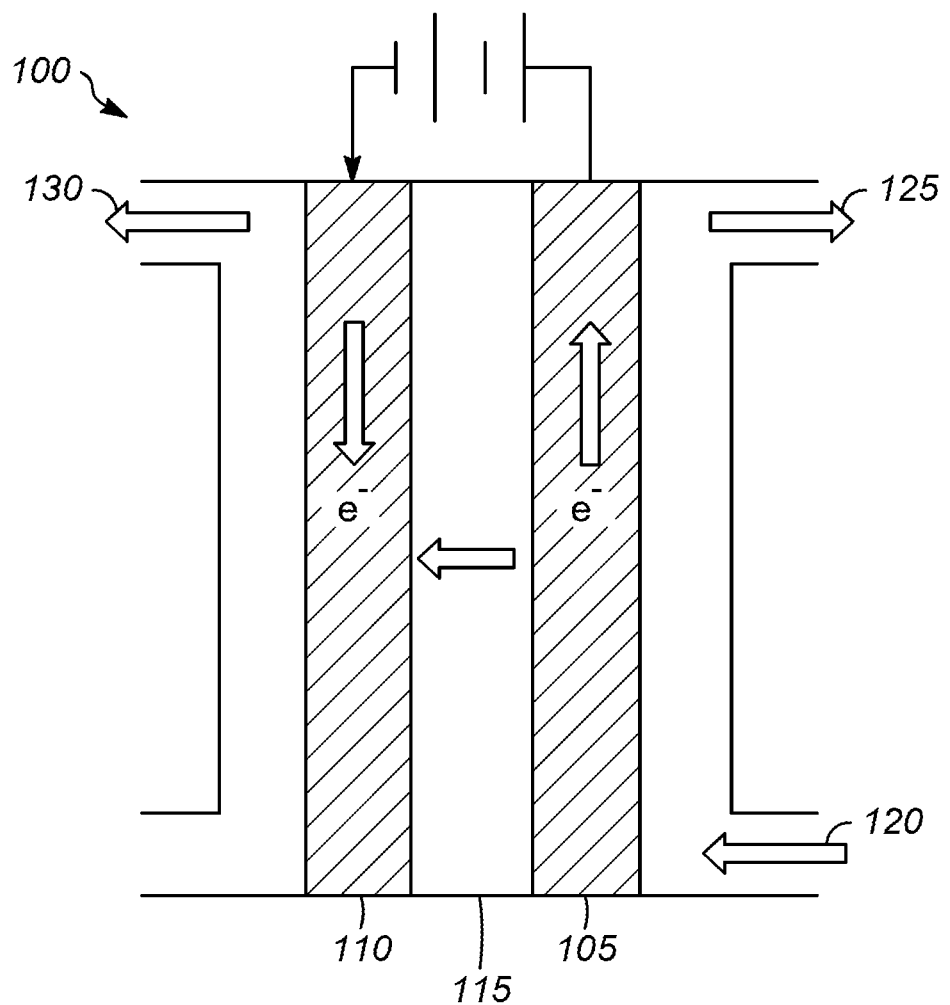
FIG. 1 is an illustration of one embodiment of a PEMWE cell.

As shown in FIG. 1, in a PEMWE system 100, an anode 105 and a cathode 110 are separated by a solid PEM electrolyte 115. The anode and cathode catalysts typically comprise $IrO_2$ and Pt, respectively. At the positively charged anode 105, pure water 120 is oxidized to produce oxygen gas 125, electrons ($e^-$), and protons; the reaction is given by Eq. 2. The protons are transported from the anode 105 to the cathode 110 through the PEM 115 that conducts protons. At the negatively charged cathode 110, a reduction reaction takes place with electrons from the cathode 110 being given to protons to form hydrogen gas 130; the reaction is given by Eq. 3. The PEM 115 not only conducts protons from the anode 105 to the cathode 110, but also separates the $H_2$ gas 130 and $O_2$ gas 125 produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware such as the Pt-coated Ti bipolar plates, expensive noble metal catalysts required for the electrodes, as well as the expensive PEM.

One example of a commercially available membrane used for the solid PEM electrolyte is sulfonated tetrafluoroethylene based cofluoropolymer sold under the trademark Nafion® by Chemours Company. Other examples of commercially available membranes used for the solid PEM electrolyte are perfluorosulfonic acid polymer membranes such as FS-960-RF, FS-990-PK, F-10120-PK, and F-10150-PTFE sold under the trademark Fumasep® by FUMATECH BWT and fluorinated ion exchange membrane sold under the trademark Flemion® by AGC Chemicals Company.

An electrolysis system has been developed using an ionically conductive membrane. Suitable ionically conductive membranes include, but are not limited to, cation exchange membranes comprising $-SO_3^-$, $-COO^-$, $-PO_3^{2-}$, or $-PO_3H^-$ cation exchange functional groups prepared from perfluorinated ionomers such as Nafion®, Flemion®, and NEOSEPTA®-F, partially fluorinated polymers, non-fluorinated hydrocarbon polymers, or non-fluorinated polymers with aromatic backbone, and polyelectrolyte multilayer coated proton-exchange membranes.

The polyelectrolyte multilayer coated proton-exchange membrane is described in U.S. application Ser. No. 17/451,227, filed Oct. 18, 2021, entitled Polyelectrolyte Multilayer Coated Proton Exchange Membrane for Electrolysis and Fuel Cell Applications, which is incorporated herein by reference in its entirety. The polyelectrolyte multilayer coated proton-exchange membrane comprises: a cation exchange membrane, and a polyelectrolyte multilayer coating on one or both surfaces of the cation exchange membrane. The polyelectrolyte multilayer coating comprises alternating layers of a polycation polymer and a polyanion polymer. The polycation polymer layer is deposited on and is in contact with the cation exchange membrane. There can be one, two, three, four, five, or more sets of alternating polycation polymer and polyanion polymer layers on one or both sides of the cation exchange membrane. The top layer of the polyelectrolyte multilayer coating can be either a polycation polymer layer or a polyanion polymer layer.

Polyelectrolyte multilayer coated proton-exchange membranes have several advantages including low membrane area specific resistance and significantly reduced $H_2$ and $O_2$ crossover, lower cost, and enhanced proton ($H^+$) conductivity compared to a commercially available membrane, such as a Nafion® 115 membrane.

Prior to use or during start-up, the electrolysis system needs to be conditioned. Typical conditioning conditions for PEMWE using Nafion® membranes include a temperature lower or at the operating temperature and a voltage lower or at the cell operating voltage.

However, it has been found that electrolysis systems using new ionically conductive membranes, such as polyelectrolyte multilayer coated proton exchange membranes, do not react like standard PEM membranes, requiring a significantly longer break-in period before optimal performance is achieved. This is evidenced by very high initial cell resistance, and current oscillations and responding voltage oscillation (High-Frequency Resistance (HFR)) that lower more slowly than with Nafion® membranes. In addition, the ionically conductive membrane needs a longer exposure at high temperature to avoid reversal to high resistance when the temperature is lowered, unlike traditional Nafion® membranes which retain improved conductivity when the temperature is lowered after a high temperature excursion.

Consequently, a new start-up process has been developed for conditioning an electrolysis system containing an ionically conductive membrane, such as a polyelectrolyte multilayer coated proton exchange membrane, to reduce the break-in period.

The conditioning involves heating the electrolysis feed, the electrolysis system, or both at a temperature above the desired operating temperature to achieve faster startup. Furthermore, in some embodiments, the electrolysis system is conditioned at high current density (e.g., greater than 300 mA/cm²). Because high initial current density cannot be achieved without also elevating the voltage significantly, the protocol is based on controlling the voltage to avoid damage to the sample. Damage can occur if the cell voltage is too high (e.g., greater than 4 V).

After conditioning, the temperature of the electrolysis feed, the electrolysis system, or both is reduced to the desired operating temperature.

The electrolysis feed, the electrolysis system, or both are heated at a conditioning temperature higher than the desired operating temperature.

The electrolysis feed can be water. The electrolysis feed can be in a liquid state or a gas/vapor state or a combination of liquid and gas/vapor states.

The electrolysis feed may contact the anode electrode, the cathode electrode, or both.

In some embodiments, the desired operating temperature is in the range of about 60° C. to about 150° C., or about 60° C. to about 140° C., or about 60° C. to about 130° C., or about 60° C. to about 120° C., or about 60° C. to about 110° C., or about 60° C. to about 110° C., or about 60° C. to about 100° C., or about 60° C. to about 90° C., or about 60° C. to about 80° C., or about 70° C. to about 150° C., or about 80° C. to about 150° C., or about 90° C. to about 150° C., or about 100° C. to about 150° C., or about 110° C. to about 150° C., or about 120° C. to about 150° C., or about 130° C. to about 150° C., or about 140° C. to about 150° C.

In some embodiments, the conditioning temperature is at least 10° C. higher than the desired operating temperature, or at least 20° C., or at least 30° C., or at least 40° C., or at least 50° C., or at least 60° C. In some embodiments, the conditioning temperature is in the range of about 70° C. to about 170° C., or about 70° C. to about 160° C., or about 70° C. to about 150° C., or about 70° C. to about 140° C., or about 70° C. to about 130° C., or about 70° C. to about 120° C., or about 70° C. to about 110° C., or about 70° C. to about 100° C., or about 70° C. to about 90° C., or about 70° C. to about 80° C., or about 80° C. to about 170° C., or about 90° C. to about 170° C., or about 100° C. to about 170° C., or about 110° C. to about 170° C., or about 120° C. to about 170° C., or about 130° C. to about 170° C., or about 140° C. to about 170° C., or about 150° C. to about 170° C., or about 160° C. to about 170° C.

In some embodiments, the desired operating temperature is in the range of about 60° C. to about 80° C., and the conditioning temperature is in the range of about 80° C. to about 100° C. In some embodiments, the desired operating temperature is in the range of about 60° C. to about 100° C., and the conditioning temperature is in the range of about 80° C. to about 120° C. In some embodiments, the desired operating temperature is in the range of about 60° C. to about 120° C., and the conditioning temperature is in the range of about 80° C. to about 140° C. In some embodiments, the desired operating temperature is in the range of about 75° C. to about 100° C., and the conditioning temperature is in the range of about 95° C. to about 120° C.

The electrolysis system is conditioned for a time in the range of about 30 min to about 100 h, or about 30 min to about 90 h, or about 30 min to about 80 h, or about min to about 70 h, or about 30 min to about 60 h, or about 30 min to about 50 h.

The electrolysis system is conditioned at a cell voltage in the range of about 1.23 V to about 3.7 V at the conditioning temperature, or about 1.23 V to about 3.5 V, or about 1.23 V to about 3.25 V, or about 1.23 V to about 3.0 V, or about 1.23 V to about 2.75 V, or about 1.23 V to about 2.5 V.

Medium (e.g., 100 to 200 mA/cm²) to high (e.g., greater than 300 mA/cm², for example 300 to 600 mA/cm²) current densities are desirable, which can be produced using the temperature and voltage conditions given. Suitable current densities include, but not limited to, 100 to 200 mA/cm², or 100 to 300 mA/cm², or 100 to 400 mA/cm², or 100 to 500 mA/cm², or 100 to 600 mA/cm², or 200 to 300 mA/cm², or 200 to 400 mA/cm², or 200 to 500 mA/cm², or 200 to 600 mA/cm², or 300 to 400 mA/cm², or 300 to 500 mA/cm², or 300 to 600 mA/cm², or 400 to 500 mA/cm², or 400 to 600 mA/cm², or 500 to 600 mA/cm².

The anode electrode may comprise a supported or unsupported oxygen evolution reaction catalyst. Any oxygen evolution reaction catalyst may be used. Suitable oxygen evolution reaction catalysts include, but are not limited to, iridium, ruthenium, osmium, rhodium, palladium, platinum, tin, tungsten, vanadium, cobalt, silver, gold, or their oxides, or mixtures, or alloys thereof. The anode electrode can be coated on a first surface of the ionically conductive membrane. Suitable supports for the supported oxygen evolution reaction catalyst include, but are not limited to, titanium oxide, aluminum oxide, silicon dioxide, zirconium dioxide, yttrium oxide, cerium oxide, cerium dioxide, lanthanum oxide, tin oxide, tungsten oxide, molybdenum oxide, niobium oxide, tantalum oxide, tin oxide, and anion and cation doped varieties of these oxides, such as (but not limited to) fluoro-doped tin oxide, indium-doped and antimony-doped tin oxide, and mixtures thereof.

The cathode electrode may comprise a supported or unsupported hydrogen evolution reaction catalyst. Any hydrogen evolution reaction catalyst may be used. Suitable hydrogen evolution reaction catalysts include, but are not limited to, platinum, ruthenium, osmium, rhodium, palladium, tin, tungsten, vanadium, cobalt, silver, gold, or their oxides, or mixtures, or alloys thereof. The cathode electrode may be coated on a second surface of the ionically conductive membrane. Suitable supports for the supported hydrogen evolution reaction catalyst include, but are not limited to, activated carbon, carbon molecular sieve, carbon nanotube, graphene, graphene oxide, titanium oxide, aluminum oxide, silicon dioxide, zirconium dioxide, yttrium oxide, cerium oxide, cerium dioxide, lanthanum oxide, tin oxide, tungsten oxide, molybdenum oxide, niobium oxide, tantalum oxide, tin oxide, and anion and cation doped varieties of these oxides, such as (but not limited to) nitrogen-doped carbon, fluoro-doped tin oxide, indium-doped and antimony-doped tin oxide, and mixtures thereof.

There may be an anode porous transport layer adjacent to the anode electrode on a side opposite the ionically conductive membrane. There may also be a cathode gas diffusion layer adjacent to the cathode electrode on a side opposite the ionically conductive membrane.

Figure 2:
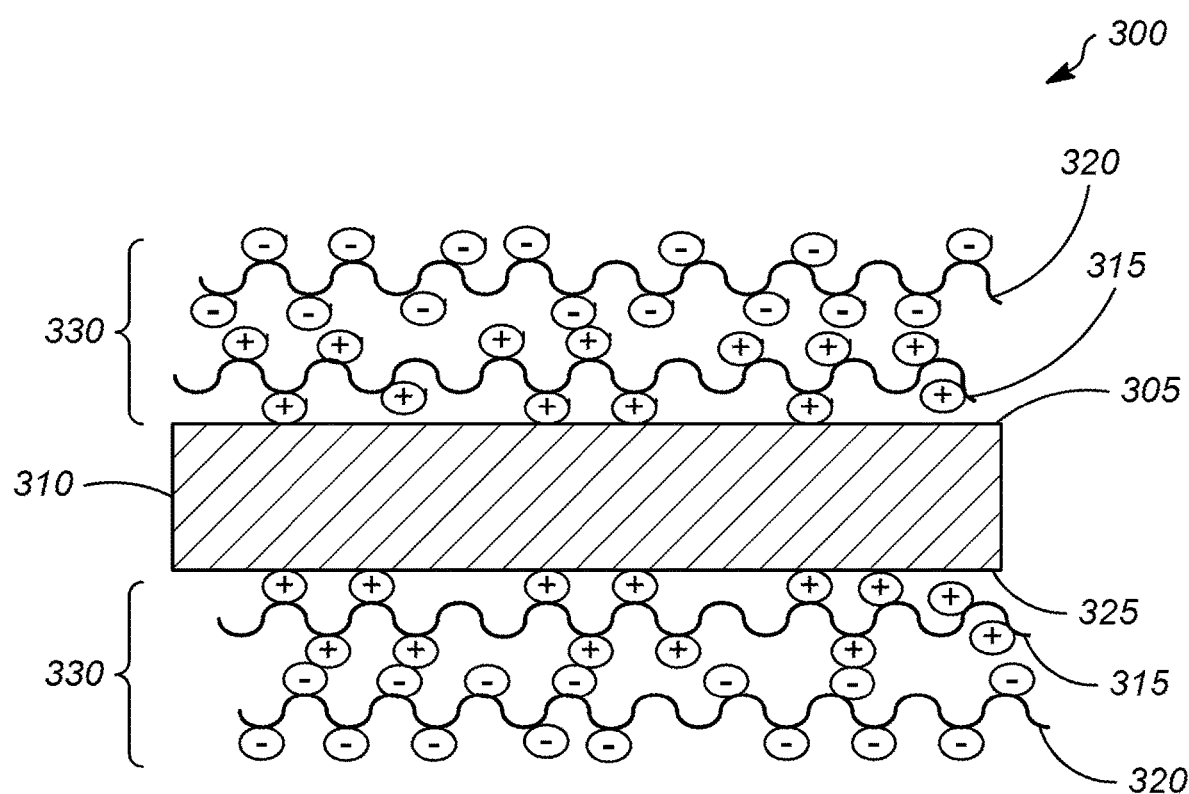
FIG. 2 is an illustration of one embodiment of a polyelectrolyte multilayer coated proton-exchange membrane.

FIG. 2 is an illustration of the polyelectrolyte multilayer coated proton-exchange membrane 300. On the surface 305 of the cation exchange membrane 310, there is a polyeletrolyte multilayer coating 330. The polyeletrolyte multilayer coating 330 comprises alternating layers of a polycation polymer 315 and a polyanion polymer 320. There may be a second polyeletrolyte multilayer coating 330 comprising alternating layers of a polycation polymer 315 and a polyanion polymer 320 on the opposite surface 325 of the cation exchange membrane 310.

The polyanion polymer in the polyelectrolyte multilayer coating may be different from the cation exchange polymer in the cation exchange membrane.

The cation exchange membrane comprises a cation exchange polymer or a mixture of a cation exchange polymer and an inorganic filler comprising covalently bonded acidic functional groups. The cation exchange membrane in the new polyelectrolyte multilayer improved proton-exchange membrane comprises —$SO_3^-$, —$COO^-$, —$PO_3^{2-}$, or —$PO_3H^-$ cation exchange functional groups with negative ionic charges. The cation exchange polymer in the cation exchange membrane may be selected from, but is not limited to, a perfluorinated ionomer such as Nafion®, Flemion®, Fumion®, Aciplex®, Aquivion®, Fumapem® FS, BAM®, or NEOSEPTA®-F, a cross-linked perfluorinated cation-exchange polymer, a partially fluorinated polymer, a cross-linked partially fluorinated cation-exchange polymer, a non-fluorinated hydrocarbon polymer, a cross-linked non-fluorinated hydrocarbon cation-exchange polymer, or combinations thereof. The cation exchange membrane has high mechanical strength, good chemical and thermal stability, and good proton conductivity. However, the cation exchange membrane typically has high cost, high area specific resistance, and high $H_2$ and $O_2$ crossover when thinner membrane with lower cost and lower area specific resistance is used for electrolysis and fuel cell applications. The new polyelectrolyte multilayer improved proton-exchange membrane has low membrane area specific resistance, low swelling, significantly reduced $H_2$ and $O_2$ crossover, and enhanced proton conductivity compared to the cation exchange membrane without the polyelectrolyte multilayer coating.

The cation exchange membrane for the preparation of the polyelectrolyte multilayer cation exchange membrane maybe the composite proton conductive membrane described in U.S. patent application Ser. No. 17/162,421, filed on Jan. 29, 2021, entitled Composite Proton Conductive Membranes, which is incorporated herein by reference in its entirety. That application disclosed a new type of composite proton conductive membrane comprising an inorganic filler having covalently bonded acidic functional groups and a high surface area of at least 150 $m^2/g$, and a water insoluble ionically conductive polymer. The deposition of the polyelectrolyte multilayer coating on the composite proton conductive membrane resulted in reduced membrane swelling, significantly reduced $H_2$ and $O_2$ crossover, and enhanced proton conductivity compared to the composite proton conductive membrane without the polyelectrolyte multilayer coating.

The inorganic filler comprising covalently bonded acidic functional groups in the cation exchange membrane may be selected from, but is not limited to, silica gel, precipitated silica, fumed silica, colloidal silica, alumina, silica-alumina, zirconium oxide, molecular sieve, metal-organic framework, zeolitic imidazolate framework, covalent organic framework, or a combination thereof, and wherein the filler may comprise both covalently bonded acidic functional groups and a high surface area of 150 $m^2/g$ or higher, or 300 $m^2/g$ or higher, or 400 $m^2/g$ or higher. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves can have different chemical compositions and different framework structure. The molecular sieves can be microporous or mesoporous molecular sieves and need to be stable in aqueous solution under pH of less than 6. The acidic functional groups covalently bonded to the inorganic fillers may be selected from, but are not limited to, —$H_2PO_3$, —R—$H_2PO_3$, —$SO_3H$, —R—$SO_3H$, —COOH, —R—COOH, —$C_6H_5OH$, —R—$C_6H_5OH$, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10. The inorganic fillers may be in the form of, but are not limited to, particles, fine beads, thin plates, rods, or fibers. The size of the inorganic filler is in a range of about 2 nm to about 200 μm, or in a range of about 10 nm to about 100 μm, or in a range of about 50 nm to about 80 μm. In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

Suitable cation exchange polymers include, but are not limited to, a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof. Suitable cation exchange polymers include, but are not limited to, a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof.

The first layer deposited on one or both surfaces of the cation exchange membrane possessing negative ionic charges should be a polycation polymer layer having positive ionic charges, opposite from those on the cation exchange membrane, which leads to the formation of a stable coating as the first part of the first polyelectrolyte bilayer via electrostatic interactions between the cation exchange polymer of the cation exchange membrane and the polycation deposited on the surface of the cation exchange membrane. A polyanion polymer with opposite charges is then deposited on the surface of the first polycation polymer coating layer via electrostatic interactions to form the second part of the first polyelectrolyte bilayer. Polyelectrolyte multilayers of either cation exchange membrane/(polycation-polyanion)$_n$ or polyanion-polycation)$_n$/cation exchange membrane/(polycation-polyanion)$_n$ can be formed following the same alternating deposition process. The thickness of each layer of the polyanion or polycation is less than 50 nm, or less than 20 nm, or less than 10 nm, or less than 5 nm. The polyanion polymer in the polyelectrolyte multilayers has negative charges and can be the same or different from the cation exchange polymer in the cation exchange membrane, but the polyanion polymer cannot be the first polyelectrolyte layer deposited on the surface of the cation exchange membrane having negative charges. The polyanion polymer suitable for the preparation of the polyelectrolyte multilayer coated proton-exchange membrane has similar or higher proton conductivity than the cation exchange membrane and has similar or lower $H_2$ and $O_2$ permeabilities than the cation exchange membrane. However, the polyanion polymer and the polycation polymer may be soluble in aqueous solutions, which makes the membranes prepared from either the polyanion polymer or polyanion polymer unsuitable for water electrolysis or fuel cell applications. The polyelectrolyte multilayers deposited on one or both surfaces of the cation exchange membrane via layer-by-layer self-assembly are not only insoluble and thermally and chemically stable, but also have significantly reduced swelling and $H_2$ and $O_2$ crossover of the cation exchange membrane, and enhanced proton conductivity compared to the cation exchange membrane for water electrolysis or fuel cell applications.

The polycation polymers suitable for the preparation of the polyelectrolyte multilayer coated proton-exchange membrane include, but are not limited to protonated chitosan; an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(-vinylpiperidine hydrochloride), poly(-vinylpiperidine hydrochloride), poly(diallyldimethylammonium chloride), poly(acrylamide-co-diallyldimethylammonium chloride), poly(diallyl methyl amine hydrochloride), a copolymer of 2-propen-1-aminehydrochloride with N-2-propenyl-2-propen-1-aminehydrochloride, poly(N-alkyl-4-vinylpyridinium) salt, polylysine, polyornithine, polyarginine, poly(ethylene oxide)-block-poly(vinyl benzyl trimethylammonium chloride), poly(ethylene oxide)-block-poly(1-lysine), poly(2-methacryloyloxyethyl phosphorylcholine methacrylate)-beck-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly[3-(dimethylamino)propyl methacrylamide], poly[2-(trimethylamino) ethyl methacrylate chloride], poly[2-(diethylamino)ethyl methacrylate], poly[2-(dimethylamino) ethyl acrylate]; or combinations thereof.

The polyanion polymers suitable for the preparation of the polyelectrolyte multilayer coated proton-exchange membrane include but, are not limited to, a sulfonated hydrocarbon polymer, poly(acrylic acid), poly(sodium phosphate), or a negatively charged polysaccharide polyanion polymer, or combinations thereof. Suitable sulfonated hydrocarbon polymers include, but are not limited to, sulfonated poly (ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), or combinations thereof. Suitable negatively charged polysaccharide polyanion polymers include, but are not limited to, sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof.

The polyelectrolyte multilayer coating may be formed using a layer-by-layer self-assembly method. The layer-by-layer self-assembly may be achieved by adsorption, electrostatic interactions, covalent bonds, hydrogen bonds, van der Waals forces, hydrophobic interactions, or combinations thereof, for example. The methods for the formation of polyelectrolyte multilayer coating via layer-by-layer self-assembly may be selected from, but are not limited to, dip coating, spray deposition, centrifugal deposition, electrodeposition, meniscus/slot die coating, brushing, roller coating, metering rod/Meyer bar coating, knife casting, and the like.

The choice of the fabrication method depends on the polycation and polyanion to be assembled, the time required for the layer-by-layer self-assembly, and the shape of the cation exchange membrane that the polyelectrolyte multilayer coating will be deposited on. The first polyelectrolyte layer is formed by the adsorption (for example) of a polycation or polyanion on one or both surfaces of the cation exchange membrane possessing opposite charges. Subsequently, the second layer of the polyelectrolyte with charges opposite from the first layer of the polyelectrolyte is deposited on the first layer of the polyelectrolyte to form one set of alternating layers on the cation exchange membrane. A nanostructured polyelectrolyte multilayer coating with n sets of alternating layers on one or both surfaces of the cation exchange membrane results in a new proton-exchange membrane of cation exchange membrane/(polycation-polyanion)$_n$ or (polyanion-polycation)$_n$/cation exchange membrane/(polycation-polyanion)$_n$, respectively. The increase in polyelectrolyte multilayer thickness depends on the number of layers deposited and can be either linear or non-linear. Several parameters, such as ionic strength, pH, temperature, polyelectrolyte structure, concentration, and charge density, can be adjusted during the layer-by-layer self-assembly process. The oppositely changed polyelectrolyte layers are deposited on the surface of the cation exchange membrane. The polyelectrolyte multilayers are insoluble and thermally and chemically stable.

One aspect of the invention is a method of conditioning an electrolysis system comprising: providing the electrolysis system comprising: at least one cell comprising a cathode electrode, an anode electrode, and an ionically conductive membrane positioned between the cathode electrode and the anode electrode; conditioning the electrolysis system by heating an electrolysis feed, the electrolysis system, or both at a conditioning temperature higher than a desired operating temperature for a time in a range of about 30 minutes to about 100 hours; and reducing a temperature of the electrolysis feed, the electrolysis system, or both to the desired operating temperature.

In some embodiments, the conditioning temperature is at least 10° C. higher than the desired operating temperature.

In some embodiments, the conditioning temperature is at least 20° C. higher than the desired operating temperature.

In some embodiments, the desired operating temperature is in a range of about 60° C. to about 150° C., and wherein the conditioning temperature is in a range of about 70° C. to about 170° C.

In some embodiments, the desired operating temperature is in a range of about 80° C. to about 120° C., and wherein the conditioning temperature is in a range of about 90° C. to about 140° C.

In some embodiments, the method further comprises: conditioning the electrolysis system at a cell voltage in a range of about 1.23 V to about 3.5 V at the conditioning temperature.

In some embodiments, the method further comprises: conditioning the electrolysis system at a cell voltage in a range of about 1.23 V to about 2.5 V at the conditioning temperature.

In some embodiments, the ionically conductive membrane is a polyelectrolyte multilayer coated proton-exchange membrane comprising a cation exchange membrane and a polyelectrolyte multilayer coating on a surface of the cation exchange membrane, wherein the polyelectrolyte multilayer coating comprises alternating layers of a polycation polymer and a polyanion polymer, and wherein the polycation polymer layer is in contact with the cation exchange membrane.

In some embodiments, there is a second polyelectrolyte multilayer coating on a second surface of the cation exchange membrane.

In some embodiments, there are at least two sets of alternating layers of the polycation polymer and the polyanion polymer on the surface of the cation exchange membrane.

In some embodiments, the cation exchange membrane comprises a cation exchange polymer or a mixture of a cation exchange polymer and an inorganic filler comprising covalently bonded acidic functional groups.

In some embodiments, the anode electrode is coated on a first surface of the ionically conductive membrane.

In some embodiments, the cathode electrode is coated on a second surface of the ionically conductive membrane.

In some embodiments, the electrolysis system is a water electrolysis system.

In some embodiments, the anode electrode comprises a supported or unsupported oxygen evolution reaction catalyst.

In some embodiments, the oxygen evolution reaction catalyst comprises iridium, ruthenium, osmium, rhodium, palladium, platinum, tin, tungsten, vanadium, cobalt, silver, gold, or their oxides, or mixtures, or alloys thereof.

In some embodiments, the cathode electrode comprises a supported or unsupported hydrogen evolution reaction catalyst.

In some embodiments, the hydrogen evolution reaction catalyst comprises platinum, ruthenium, osmium, rhodium, palladium, tin, tungsten, vanadium, cobalt, silver, gold, or their oxides, or mixtures, or alloys thereof.

In some embodiments, the method further comprises: an anode porous transport layer adjacent to the anode electrode on a side opposite the ionically conductive membrane; and a cathode gas diffusion layer adjacent to the cathode electrode on a side opposite the ionically conductive membrane.

In some embodiments, the electrolysis feed contacts the anode electrode, the cathode electrode, or both.

EXAMPLES

Example 1

Two equivalent PEMWE catalyst coated membrane samples were assembled in two equivalent cells, using the same porous transport layers. The PEMWE catalyst coated membrane samples were prepared by spray coating a Pt/C cathode catalyst layer on one surface of a polyelectrolyte multilayer-coated Nafion® 212 membrane, ((SPEEK-PAH)$_3$/Nafion®-212/(PAH-SPEEK)$_3$) and an IrO$_2$ anode catalyst layer on the other surface of the membrane, as described in Example 1 in U.S. application Ser. No. 17/451,227 (the '227 Application), filed Oct. 18, 2021, entitled Polyelectrolyte Multilayer Coated Proton Exchange Membrane for Electrolysis and Fuel Cell Applications (which is incorporated herein in its entirety). The cell conditioned at the desired operation temperature of 80° C. and 1.7V required 30 h to achieve 1.4 A/cm$^2$, whereas the cell conditioned at 95° C. for an operating temperature of 80° C. required less than 6 hours to achieve this current density. Performance in the following 80° C. polarization curve was identical for the two samples, showing no negative effect of the higher temperature conditioning on the subsequent lower temperature performance.

Example 2

Two PEMWE catalyst coated membranes comprising the same spray coated Pt/C cathode catalyst coating layer and IrO$_2$ anode catalyst coating layer on the opposite surfaces of two polyelectrolyte multilayer-coated membranes were made as described in Examples 1 and 4 in the '227 Application. The first polyelectrolyte multilayer-coated membrane ((SPEEK-PAH)$_3$/Nafion®-212/(PAH-SPEEK)$_3$) had a thickness of about 51 µm and the second polyelectrolyte multilayer-coated membrane ((SPEEK-PAH)$_3$/Nafion®-115/(PAH-SPEEK)$_3$) had a thickness of about 127 µm. The two PEMWE catalyst coated membranes were assembled in two equivalent cells, using the same porous transport layers. Both samples were conditioned at 90° C. and 1.7V for an operating temperature of 80° C. The sample with the thicker 127 µm membrane conditioned slower in terms of resistance decrease per unit time, due to the higher resistance of the thicker membrane allowing for lower current density at 1.7V. It was noted that the decrease in resistance per unit time for the two samples is the same at equal current density, through separated in time with the thinner (SPEEK-PAH)$_3$/Nafion®-212/(PAH-SPEEK)$_3$ membrane. For example, the thinner ((SPEEK-PAH)$_3$/Nafion®-212/(PAH-SPEEK)$_3$ achieved 600 mA/cm$^2$ 6.5 hours sooner than the thicker (SPEEK-PAH)$_3$/Nafion®-115/(PAH-SPEEK)$_3$ membrane in the conditioning step (20 h versus 26.5 h after sample initialization), with the rate of resistance decrease equal at 600 mA/cm$^2$ (decade of hours/decade of Ohms)

Example 3

An equivalent sample to the polyelectrolyte multilayer-coated membrane ((SPEEK-PAH)$_3$/Nafion®-115/(PAH-SPEEK)$_3$) with spray coated Pt/C cathode catalyst coating layer and IrO$_2$ anode catalyst coating layer as described in Example 2 was placed in the same cell as Example 2, but heated to 60° C. instead of 90° C., whereupon it showed severe mass transport limitation, limiting the maximum achievable current density at <2V cell voltage of 450 mA/cm$^2$. This mass transport limitation was not observed for the equivalent sample heated to 90° C. prior to the polarization curve, as described in Example 2.

By "about." we mean within 10% of the value, or within 5%, or within 1%.

Specific Embodiments

While the following is described in conjunction with specific embodiments, it will be understood that this description is intended to illustrate and not limit the scope of the preceding description and the appended claims.

A first embodiment of the invention is a method of conditioning an electrolysis system comprising providing the electrolysis system comprising at least one cell comprising a cathode electrode, an anode electrode, and an ionically conductive membrane positioned between the cathode electrode and the anode electrode, conditioning the electrolysis system by heating an electrolysis feed, the electrolysis system, or both at a conditioning temperature higher than a desired operating temperature for a time in a range of about 30 minutes to about 100 hours; and reducing a temperature of the electrolysis feed, the electrolysis system, or both to the desired operating temperature. An embodiment of the invention is one, any or all of prior embodiments in this paragraph up through the first embodiment in this paragraph wherein the conditioning temperature is at least 10° C. higher than the desired operating temperature. An embodiment of the invention is one, any or all of prior embodiments in this paragraph up through the first embodiment in this paragraph wherein the conditioning temperature is at least 20° C. higher than the desired operating temperature. An embodiment of the invention is one, any or all of prior embodiments in this paragraph up through the first embodiment in this paragraph wherein the desired operating temperature is in a range of about 60° C. to about 150° C., and wherein the conditioning temperature is in a range of about 70° C. to about 170° C. An embodiment of the invention is one, any or all of prior embodiments in this paragraph up through the first embodiment in this paragraph wherein the desired operating temperature is in a range of about 80° C. to about 120° C., and wherein the conditioning temperature is in a range of about 90° C. to about 140° C. An embodiment of the invention is one, any or all of prior embodiments in this paragraph up through the first embodiment in this paragraph further comprising conditioning the electrolysis system at a cell voltage in a range of about 1.23 V to about 3.5 V at the conditioning temperature. An embodiment of the invention is one, any or all of prior embodiments in this paragraph up through the first embodiment in this paragraph further comprising conditioning the electrolysis system at a cell voltage in a range of about 1.23 V to about 2.5 V at the conditioning temperature. An embodiment of the invention is one, any or all of prior embodiments in this paragraph up through the first embodiment in this paragraph wherein the ionically conductive membrane is a polyelectrolyte multilayer coated proton-exchange membrane comprising a cation exchange membrane and a polyelectrolyte multilayer coating on a surface of the cation exchange membrane, wherein the polyelectrolyte multilayer coating comprises alternating layers of a polycation polymer and a polyanion polymer, and wherein the polycation polymer layer is in contact with the cation exchange membrane. An embodiment of the invention is one, any or all of prior embodiments in this paragraph up through the first embodiment in this paragraph wherein there is a second polyelectrolyte multilayer coating on a second surface of the cation exchange membrane. An embodiment of the invention is one, any or all of prior embodiments in this paragraph up through the first embodiment in this paragraph wherein there are at least two sets of alternating layers of the polycation polymer and the polyanion polymer on the surface of the cation exchange membrane. An embodiment of the invention is one, any or all of prior embodiments in this paragraph up through the first embodiment in this paragraph wherein the cation exchange membrane comprises a cation exchange polymer or a mixture of a cation exchange polymer and an inorganic filler comprising covalently bonded acidic functional groups. An embodiment of the invention is one, any or all of prior embodiments in this paragraph up through the first embodiment in this paragraph wherein the anode electrode is coated on a first surface of the ionically conductive membrane. An embodiment of the invention is one, any or all of prior embodiments in this paragraph up through the first embodiment in this paragraph wherein the cathode electrode is coated on a second surface of the ionically conductive membrane. An embodiment of the invention is one, any or all of prior embodiments in this paragraph up through the first embodiment in this paragraph wherein the electrolysis system is a water electrolysis system. An embodiment of the invention is one, any or all of prior embodiments in this paragraph up through the first embodiment in this paragraph wherein the anode electrode comprises a supported or unsupported oxygen evolution reaction catalyst. An embodiment of the invention is one, any or all of prior embodiments in this paragraph up through the first embodiment in this paragraph wherein the oxygen evolution reaction catalyst comprises iridium, ruthenium, osmium, rhodium, palladium, platinum, tin, tungsten, vanadium, cobalt, silver, gold, or their oxides, or mixtures, or alloys thereof. An embodiment of the invention is one, any or all of prior embodiments in this paragraph up through the first embodiment in this paragraph wherein the cathode electrode comprises a supported or unsupported hydrogen evolution reaction catalyst. An embodiment of the invention is one, any or all of prior embodiments in this paragraph up through the first embodiment in this paragraph wherein the hydrogen evolution reaction catalyst comprises platinum, ruthenium, osmium, rhodium, palladium, tin, tungsten, vanadium, cobalt, silver, gold, or their oxides, or mixtures, or alloys thereof. An embodiment of the invention is one, any or all of prior embodiments in this paragraph up through the first embodiment in this paragraph further comprising an anode porous transport layer adjacent to the anode electrode on a side opposite the ionically conductive membrane; and a cathode gas diffusion layer adjacent to the cathode electrode on a side opposite the ionically conductive membrane. An embodiment of the invention is one, any or all of prior embodiments in this paragraph up through the first embodiment in this paragraph wherein the electrolysis feed contacts the anode electrode, the cathode electrode, or both.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method of conditioning an electrolysis system comprising:
    providing the electrolysis system comprising:
        at least one cell comprising a cathode electrode, an anode electrode, and an ionically conductive membrane positioned between the cathode electrode and the anode electrode,
    conditioning the electrolysis system by heating an electrolysis feed, the electrolysis system, or both at a conditioning temperature higher than a desired operating temperature for a time in a range of about 30 minutes to about 100 hours; and
    reducing a temperature of the electrolysis feed, the electrolysis system, or both to the desired operating temperature.

2. The method of claim 1 wherein the conditioning temperature is at least 10° C. higher than the desired operating temperature.

3. The method of claim 1 wherein the conditioning temperature is at least 20° C. higher than the desired operating temperature.

4. The method of claim 1 wherein the desired operating temperature is in a range of about 60° C. to about 150° C., and wherein the conditioning temperature is in a range of about 70° C. to about 170° C.

5. The method of claim 1 wherein the desired operating temperature is in a range of about 80° C. to about 120° C., and wherein the conditioning temperature is in a range of about 90° C. to about 140° C.

6. The method of claim 1 further comprising:
    conditioning the electrolysis system at a cell voltage in a range of about 1.23 V to about 3.5 V at the conditioning temperature.

7. The method of claim 1 further comprising:
    conditioning the electrolysis system at a cell voltage in a range of about 1.23 V to about 2.5 V at the conditioning temperature.

8. The method of claim 1 wherein the ionically conductive membrane is a polyelectrolyte multilayer coated proton-exchange membrane comprising a cation exchange membrane and a polyelectrolyte multilayer coating on a surface of the cation exchange membrane, wherein the polyelectrolyte multilayer coating comprises alternating layers of a polycation polymer and a polyanion polymer, and wherein the polycation polymer layer is in contact with the cation exchange membrane.

9. The method of claim 8 wherein there is a second polyelectrolyte multilayer coating on a second surface of the cation exchange membrane.

10. The method of claim 8 wherein there are at least two sets of alternating layers of the polycation polymer and the polyanion polymer on the surface of the cation exchange membrane.

11. The method of claim 8 wherein the cation exchange membrane comprises a cation exchange polymer or a mixture of a cation exchange polymer and an inorganic filler comprising covalently bonded acidic functional groups.

12. The method of claim 1 wherein the anode electrode is coated on a first surface of the ionically conductive membrane.

13. The method of claim 1 wherein the cathode electrode is coated on a second surface of the ionically conductive membrane.

14. The method of claim 1 wherein the electrolysis system is a water electrolysis system.

15. The method of claim 1 wherein the anode electrode comprises a supported or unsupported oxygen evolution reaction catalyst.

16. The method of claim 15 wherein the oxygen evolution reaction catalyst comprises iridium, ruthenium, osmium, rhodium, palladium, platinum, tin, tungsten, vanadium, cobalt, silver, gold, or their oxides, or mixtures, or alloys thereof.

17. The method of claim 1 wherein the cathode electrode comprises a supported or unsupported hydrogen evolution reaction catalyst.

18. The method of claim 17 wherein the hydrogen evolution reaction catalyst comprises platinum, ruthenium, osmium, rhodium, palladium, tin, tungsten, vanadium, cobalt, silver, gold, or their oxides, or mixtures, or alloys thereof.

19. The method of claim 1 further comprising:
- an anode porous transport layer adjacent to the anode electrode on a side opposite the ionically conductive membrane; and
- a cathode gas diffusion layer adjacent to the cathode electrode on a side opposite the ionically conductive membrane.

20. The method of claim 1 wherein the electrolysis feed contacts the anode electrode, the cathode electrode, or both.

* * * * *